(12) United States Patent
Meng et al.

(10) Patent No.: US 12,026,433 B2
(45) Date of Patent: Jul. 2, 2024

(54) IMAGE INTERACTION USING SOUND SIGNALS

(71) Applicant: Beijing Bytedance Network Technology Co., Ltd., Beijing (CN)

(72) Inventors: Yu Meng, Beijing (CN); Hua-Ting Chung, Culver City, CA (US)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/086,539

(22) Filed: Dec. 21, 2022

(65) Prior Publication Data

US 2023/0131399 A1     Apr. 27, 2023

Related U.S. Application Data

(63) Continuation of application No. PCT/CN2021/099112, filed on Jun. 9, 2021.

(30) Foreign Application Priority Data

Jun. 29, 2020     (CN) .......................... 202010609854.5

(51) Int. Cl.
    *G06F 3/16*     (2006.01)
(52) U.S. Cl.
    CPC .................................... *G06F 3/167* (2013.01)
(58) Field of Classification Search
    CPC ............. G06F 3/16; G06F 3/012; G06F 3/011
    (Continued)

(56) References Cited

U.S. PATENT DOCUMENTS

| 2007/0268312 A1* | 11/2007 | Marks | .................. | A63F 13/213 |
| | | | | 345/633 |
| 2008/0158334 A1* | 7/2008 | Reponen | ................. | G10L 15/26 |
| | | | | 348/14.02 |

(Continued)

FOREIGN PATENT DOCUMENTS

| CN | 110377761 A | 10/2019 |
| CN | 110691196 A | 1/2020 |

(Continued)

OTHER PUBLICATIONS

International Search Report issued in corresponding International Application No. PCT/CN2021/099112 dated Sep. 7, 2021.

(Continued)

*Primary Examiner* — Stephen S Hong
*Assistant Examiner* — Broderick C Anderson
(74) *Attorney, Agent, or Firm* — Astute IP Law Group

(57) ABSTRACT

A data processing method and apparatus, and a readable medium and an electronic device are provided. The method includes: collecting a facial image of a user by means of a terminal, and taking the collected facial image as a first facial image, displaying the first facial image in a user display area of a terminal screen; where the terminal screen displays a target object, collecting a sound signal of the user, and taking the collected sound signal as a target sound signal; and if the sound intensity of the target sound signal is within a first intensity range, switching a display state of the target object, and switching the first facial image in the user display area to a second facial image, wherein the second facial image is obtained on the basis of the first facial image.

18 Claims, 3 Drawing Sheets

(58) Field of Classification Search
USPC .......................................................... 715/728
See application file for complete search history.

(56) References Cited

U.S. PATENT DOCUMENTS

| | | | |
|---|---|---|---|
| 2010/0007665 A1* | 1/2010 | Smith | ..................... G06T 13/40 |
| | | | 345/473 |
| 2011/0131041 A1* | 6/2011 | Cortez | ................ G10L 21/0356 |
| | | | 704/235 |
| 2014/0304605 A1 | 10/2014 | Ohmura et al. | |
| 2016/0271490 A1 | 9/2016 | Tamura et al. | |
| 2018/0204372 A1 | 7/2018 | Sudheendra et al. | |
| 2018/0343534 A1 | 11/2018 | Norris et al. | |
| 2019/0197755 A1* | 6/2019 | Vats | ........................ G06T 13/80 |
| 2019/0281223 A1 | 9/2019 | Kelly et al. | |
| 2022/0263934 A1* | 8/2022 | Wang | ................ H04M 1/72454 |

FOREIGN PATENT DOCUMENTS

| | | |
|---|---|---|
| CN | 110809090 A | 2/2020 |
| EP | 3229128 A1 | 10/2017 |

OTHER PUBLICATIONS

Extended European Search Report in EP21834518.9, dated Oct. 25, 2023, 8 pages.

\* cited by examiner

IMAGE INTERACTION USING SOUND SIGNALS

The present is a continuation of international Application No. PCT/CN2021/099112, filed on Jun. 9, 2021 which disclosure claims priority of Chinese Patent Application No. 202010609854.5, titled "DATA PROCESSING METHOD AND APPARATUS, AND READABLE MEDIUM AND ELECTRONIC DEVICE", filed with the China National Intellectual Property Administration on Jun. 29, 2020, both of which are incorporated herein by reference in their entireties.

TECHNICAL FIELD

The present disclosure relates to the field of data processing, in particular to a data processing method and apparatus, a readable medium and an electronic device.

BACKGROUND

With the development of sound control technology, more and more electronic devices are equipped with sound control function. For example, a user can control the operation of a smart phone through sound. For example, in a game scene, the user controls or switches the motion state of a character in the game through sound. However, such control method is relatively simple, and cannot provide the user with a more advanced and richer use experience.

SUMMARY

The section of the Summary is provided to introduce a concept in a simplified form that is described in detail in the section of Detailed Description of the Embodiments that follows. The section of the Summary is not intended to identify key features or essential features of the claimed technical solution, and is not intended to limit the scope of the claimed technical solution.

In the first aspect, a data processing method is provided according to the present disclosure. The method includes:
  acquiring, by a terminal, a face image of a user as a first face image;
  displaying the first face image in a user display area of a screen of the terminal;
  acquiring a sound signal of the user as a target sound signal, in a case that a target object is displayed on the screen of the terminal;
  switching a display state of the target object and switching the first face image in the user display area to a second face image, in response to a sound intensity of the target sound signal within a first intensity range, where the second face image is obtained based on the first face image.

In the second aspect, a data processing apparatus is provided according to the present disclosure. The apparatus includes:
  a first acquisition module configured to acquire a face image of a user by a terminal as a first face image;
  a first display module configured to display the first face image in a user display area of a screen of the terminal;
  a second acquisition module configured to acquire a sound signal of the user as a target sound signal, in a case that a target object is displayed on the screen of the terminal;
  a second display module configured to switching a display state of the target object and switching the first face image in the user display area to a second face image, in response to a sound intensity of the target sound signal within a first intensity range, where the second face image is obtained based on the first face image.

In the third aspect, a computer-readable medium storing a computer program thereon is provided according to the present disclosure. The program, when executed by a processing apparatus, performs steps of the method according to the first aspect of the present disclosure.

In the fourth aspect, an electronic device is provided according to the present disclosure. The electronic device includes:
  a storage apparatus storing a computer program;
  a processing apparatus for executing the computer program in the storage apparatus to perform steps of the method according to the first aspect of the present disclosure.

In the above technical solution, the face image of the user is acquired by the terminal as the first face image. The first face image is displayed in the user display area of the screen of terminal. When the target object is displayed on the screen of the terminal, the sound signal of the user is acquired as the target sound signal. If the sound intensity of the target sound signal is within the first intensity range, the display state of the target object is switched, and the first face image in the user display area is switched to the second face image. The second face image is obtained based on the first face image. In this way, the user can see his own face image in real time through the screen of the terminal, enhancing the sense of participation and immersion for the user to operate the terminal. Moreover, the user can change the display content on the screen of the terminal through sound, without manual control by the user in the whole process, improving the experience of the user using the terminal.

Other features and advantages of the present disclosure will be described in detail in the section of Detailed Description of the Embodiments that follows.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments described herein. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include an additional step and/or an omitted step that is not shown herein. The scope of the present disclosure is not limited in this aspect.

The term "including" and variants thereof as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that the concepts such as "first" and "second" mentioned in the present disclosure are used to distinguish different apparatus, modules or units, and are not used to limit an sequential order or interdependence of the functions performed by the apparatus, modules or units.

It should be noted that, the modifications such as "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, and are not intended to limit the scope of the messages or information.

Figure 1:
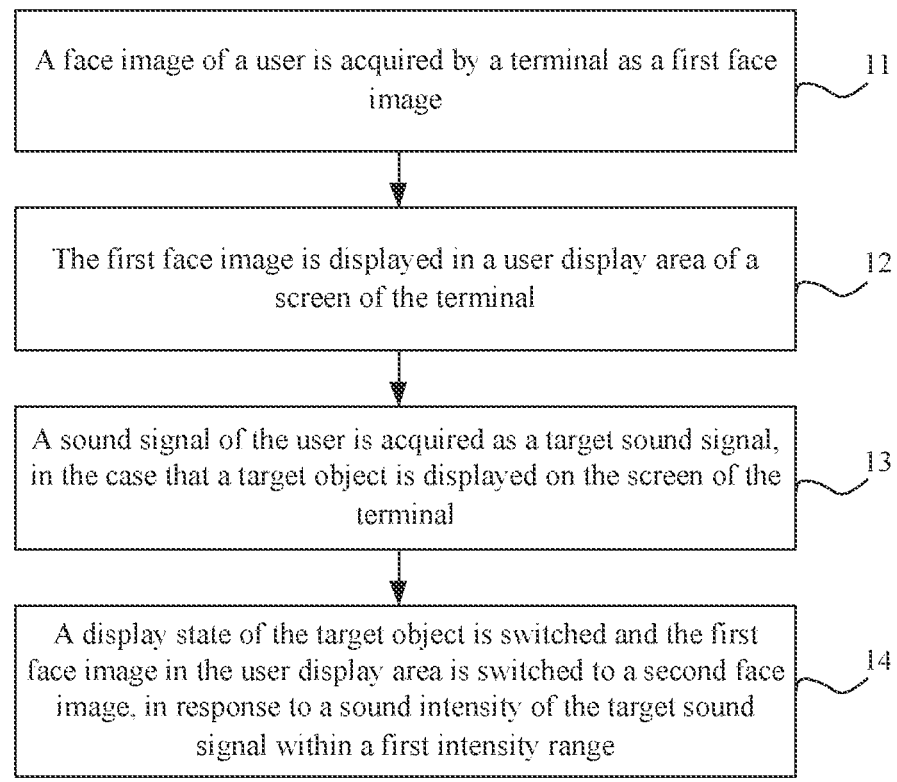
FIG. 1 is a flowchart showing a data processing method according to an embodiment of the present disclosure.

FIG. 1 is a flowchart showing a data processing method according to an embodiment of the present disclosure. As shown in FIG. 1, the method includes step 11 to step 14.

In step 11, a face image of a user is acquired by a terminal as a first face image.

In step 12, the first face image is displayed in a user display area of a screen of the terminal.

In step 13, a sound signal of the user is acquired as a target sound signal, in the case that a target object is displayed on the screen of the terminal.

In step 14, a display state of the target object is switched and the first face image in the user display area is switched to a second face image, in response to a sound intensity of the target sound signal within a first intensity range, where the second face image is obtained based on the first face image.

In steps 11 and 12, in the step of acquiring the face image by the terminal, the image of the user may be acquired by an image capturing apparatus (for example, a camera) provided on the terminal, and the face image of the user is used as the first face image. For example, if the terminal is a mobile phone and the user holds the mobile phone and faces the screen of the mobile phone, the face image of the user may be acquired by a front camera of the mobile phone, which may be used as the first face image. After the first face image is acquired, the first face image may be displayed in the user display area of the screen of the terminal. The operations of steps 11 and 12 is the operations of acquiring the face image of the user in real time, and displaying it in the user display area of the screen of the terminal to show the state of the user in real time. In this way, the experience of the user using the terminal is improved.

The sound of the user to the target object may be acquired by the terminal. When the target object is displayed on the screen of the terminal, the sound signal of the user may be acquired. For example, the sound signal of the user may be acquired by a sound acquisition device (e.g., a sound card) provided on the terminal, as the target sound signal.

After the target sound signal is acquired, the sound intensity of the target sound signal may be determined based on the target sound signal. For example, the sound intensity may be represented by a decibel, a volume, and the like. A case that the sound intensity of the target sound signal is within the first intensity range indicates that the sound of the user meets the intensity requirement of the first intensity range. The first intensity range may be set according to actual needs. For example, the desired sound intensity range is used as the first intensity range. For example, the first intensity range may be set to be greater than or equal to a first intensity threshold.

If the sound intensity of the target sound signal is within the first intensity range, the following operations may be performed:
switching the display state of the target object; and
switching the first face image in the user display area to the second face image.

The second face image is obtained based on the first face image. For example, the second face image may be an image obtained by superimposing material on the first face image. For example, the second face image is generated by superimposing special effects (or stickers, expressions, etc.) on the first face image. In a special case, the second face image may be consistent with the first face image, that is, there is no obvious change in the image observed by the user.

Based on the operations above, when the intensity of the sound of the user is within the first intensity range, the display state of the target object and the face image in the user display area are changed accordingly. In this way, the user can see his own face image in real time through the screen of the terminal, enhancing the sense of participation and immersion for the user to operate the terminal. Moreover, the display content on the screen of the terminal can be changed through the sound, which may be affected by the sound actually emitted by the user. In the whole process, no manual control by the user is required, improving the experience of the user using the terminal.

In order to enable those skilled in the art to better understand the present solution, the solution of the present disclosure will be described by way of example in combination with specific scenarios below. For the convenience of description, a currently common terminal game is taken as an example. It is assumed that in a game of breaking a brick displayed on the screen, the user needs to break the brick on the screen through sound. In this scenario, the target object is the brick displayed on the screen. The first intensity range is an intensity range of the sound for breaking the brick, which is preset in the game. The general process of the present solution may be described as follows.

When the user starts the game, the face image of the user (i.e., the first face image) is acquired by the terminal in real time and is displayed in the user display area of the screen of the terminal. The user may directly observe his facial expression through the screen in real time.

When a brick appears on the screen of the terminal, the terminal starts to acquire the sound signal of the user (i.e., target sound signal), determines whether the sound intensity of the target sound signal is within the first intensity range. If the sound intensity of the target sound signal is within the first intensity range, the display state of the brick is switched. For example, the display state of the brick is switched to a broken state, where a brick image or animation in the broken state may be drawn in advance. Moreover, the first face image in the user display area is switched to the second face image. For example, an image obtained by adding a sticker to the first face image is displayed.

In the above scenario, various types of bricks may be preset, and each type of bricks has a first intensity range corresponding to this type of bricks. When a type of brick is displayed on the screen of the terminal, the first intensity range corresponding to this type of brick is used.

That is, in the solution of the present disclosure, the target object may be set arbitrarily, and the first intensity range used to determine the target sound signal corresponds to the target object.

In the above technical solution, the face image of the user is acquired by the terminal as the first face image. The first face image is displayed in the user display area of the screen of terminal. When the target object is displayed on the screen of the terminal, the sound signal of the user is acquired as the target sound signal. If the sound intensity of the target sound signal is within the first intensity range, the display state of the target object is switched, and the first face image in the user display area is switched to the second face image. The second face image is obtained based on the first face image. In this way, the user can see his own face image in real time through the screen of the terminal, enhancing the sense of participation and immersion for the user to operate the terminal. Moreover, the user can change the display content on the screen of the terminal through sound, without manual control by the user in the whole process, improving the experience of the user using the terminal.

The solution of the present disclosure will be described below in detail based on the steps in FIG. 1.

In step 12, the first face image is displayed in the user display area of the screen of the terminal.

Figure 2:
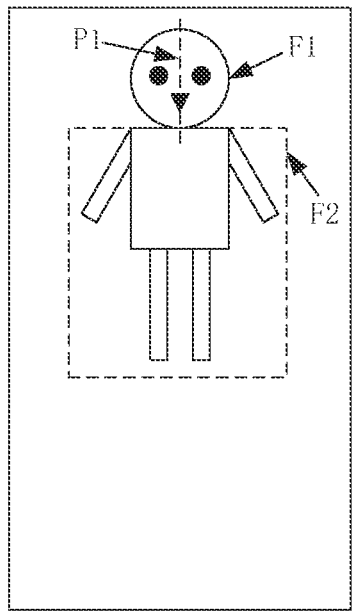
FIG. 2 is an exemplary schematic diagram of a user display area in the data processing method according to the present disclosure.

In a possible embodiment, the first face image may be displayed in a designated area (such as a designated square area, a designated circular area, etc.) on the top of the screen of the terminal. FIG. 2 is an exemplary schematic diagram of a user display area. The outer box represents the screen of the terminal, and the acquired face image of the user is displayed in a part F1 of the user display area.

Optionally, a body image may also be displayed in the user display area Generally, the body image is connected with the first face image to form a complete image of the user. Accordingly, the method provided in the present disclosure may include the following steps:

determining position information of the user according to the first face image;

determining a body image corresponding to the first face image according to the position information and pre-stored image material; and displaying the body image in the user display area.

Figure 3:
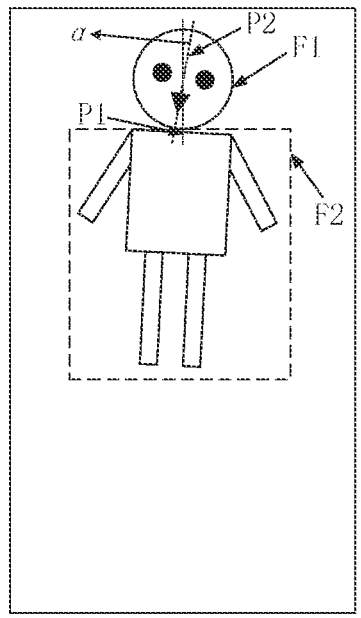
FIG. 3 is another exemplary schematic diagram of the user display area in the data processing method according to the present disclosure.

The position information of the user is used to indicate an offset direction and offset angle of the user relative to the terminal, which may be determined by the first face image. For example, a centerline of the face of the user may be determined by the first face image, and the centerline of the face of the user is compared with a centerline of a viewfinder of the terminal, to determine the offset direction and offset angle of the user relative to the terminal. As shown in FIG. 2, the user display area includes an area F1 for displaying the first face image and an area F2 for displaying the body image. P1 is the centerline of the viewfinder, FIG. 2 shows an image in the case of no offset of the first face image relative to the terminal. In FIG. 2, the centerline of the face of the user is consistent with the centerline of the viewfinder. Therefore, the body image displayed in the user display area in FIG. 2 is also no offset. As shown in FIG. 3, P2 is the centerline of the face of the user determined based on the first face image in area F1, and P1 is the centerline of the viewfinder. Based on the centerline P2 of the face of the user determined based on the first face image, the position information of the user is determined as an offset angle α to the right (clockwise) of the user relative to the terminal. Accordingly, the body image displayed in the user display area in FIG. 3 also deviates at the same offset angle in the same offset direction.

After the position information of the user is determined, the body image corresponding to the first face image is determined according to the position information and the pre-stored image material, and is displayed in the user display area of the screen of the terminal. For example, the image material may be an original body image without an offset drawn in advance. The original body image rotates a corresponding offset angle in the corresponding offset direction based on the offset direction and offset angle in the position information of the user, to obtain the body image for display. For example, if the user holds the mobile phone and tilts his head to the left, the body image displayed in the user display area is also tilted to the left. In addition, the position information of the user can not only be two-dimensional, but also three-dimensional. For example, in the case that the position information of the user is three-dimensional, a side body image may be displayed in the user display area when the user shows a side face to the terminal. Thus, the actual actions of the user may be well reflected in the screen display, enhancing the immersion sense for the user and improving the user experience.

Step 13 is described in detail below, in which the sound signal of the user is acquired as the target sound signal in the case that the target object is displayed on the screen of the terminal.

In a possible embodiment, the target object may be statically displayed on the screen of the terminal, that is, the target object is displayed at a fixed position on the screen of the terminal until it disappears from the screen of the terminal. In this embodiment, step 13 may include: in a preset period after the target object starts to be displayed on the screen of the terminal, acquiring the sound signal of the user as the target sound signal.

The preset period after the target object starts to be displayed on the screen of the terminal may be an entire period in which the target object is displayed on the screen of the terminal (that is, an entire process of displaying the target object on the screen of the terminal), or a part of the entire period in which the target object is displayed on the screen of the terminal. For example, the acquisition starts when the target object starts to be displayed on the screen of the terminal and ends when the target object disappears from the screen of the terminal. The sound signal acquired in this process is the target sound signal.

In another possible embodiment, the target object may be dynamically displayed on the screen of the terminal. The target object may move on the screen of the terminal at a first speed along a preset path in the display process of the screen of the terminal. For example, the target object appears on the left side of the screen of the terminal, moves horizontally to the right side of the screen of the terminal at the first speed, and then disappears.

In this embodiment, step 13 may include the following steps: when the target object is located in a designated area of the screen of the terminal, acquiring the sound signal of the user as the target sound signal.

For example, an area of the screen of the terminal (for example, a circular area, a square area and the like) may be preselected as the designated area. When the target object is displayed and moved on the screen of the terminal, the position of the target object is knowable. Thus, when the target object enters the designated area, the sound signal of the user is acquired; and when the target object is not in the designated area, the sound signal of the user is not acquired.

In addition, when the target object moves dynamically in the manner described above, the method provided in the present disclosure may also include the following steps:

performing a sound content recognition on the target sound signal to determine a sound content corresponding to the target sound signal; and determining a second speed corresponding to a preset keyword, in the case that the sound content corresponding to the target sound signal includes the preset keyword; and switching a moving speed of the target object on the screen of the terminal from the first speed to the second speed.

The second speed corresponding to the preset keyword may be obtained through the correspondence between the pre-stored keyword and the speed. For example, the preset keyword may be acceleration or deceleration. In the correspondence between the pre-stored keyword and the speed, the keyword "acceleration" may correspond to the speed A1 which is faster than the first speed, and the keyword "deceleration" may correspond to the speed A2 which is slower than the first speed. Thus, if the user says "acceleration", the preset keyword "acceleration" may be determined by the sound content recognition on the target sound signal, and then the second speed may be determined as A1. Thus, the moving speed of the target object on the screen of the terminal may be switched from the first speed to the second speed A1. From the user's perspective, after the user says "acceleration", the target object moves faster on the screen of the terminal.

With the above method and in combination with the sound content recognition technology, the user can control the moving speed of the target object through sound without manual setting or operation by the user, improving the user experience.

Next, an example will be given for step 14.

Figure 4:
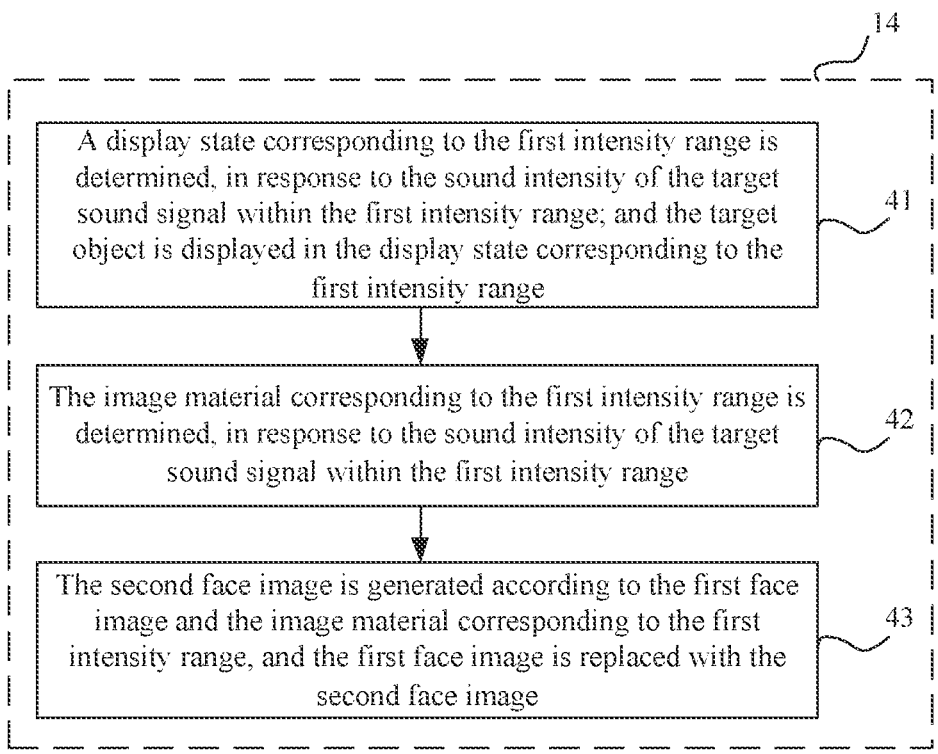
FIG. 4 is an exemplary flowchart showing a process of switching a display state of a target object and switching a first face image in the user display area to a second face image in a data processing method according to the present disclosure.

In a possible embodiment, step 14 may include the following steps, as shown in FIG. 4.

In step 41, a display state corresponding to the first intensity range is determined, in response to the sound intensity of the target sound signal within the first intensity range; and the target object is displayed in the display state corresponding to the first intensity range.

For example, a correspondence between the first intensity range and the display state may be pre-stored. In this way, if the sound intensity of the target sound signal is within the first intensity range, the display state corresponding to the first intensity range may be determined, and the target object may be displayed in the display state corresponding to the first intensity range.

In a possible embodiment, the first intensity range may be segmented into several intensity intervals, and respective intensity intervals correspond to different display states. In this way, if the sound intensity of the target sound signal is within the first intensity range, the intensity interval of the sound intensity of the target sound signal may be further determined, to determine the corresponding display state. Here, the display state may reflect the intensity interval of the target sound signal in the first intensity range, and thus the display state is more detailed.

For example, the first intensity range may be divided into a first intensity interval with low intensity and a second intensity interval with high intensity at an intermediate value. If the sound intensity of the target sound signal is within the first intensity interval, it indicates that the intensity of the sound of the user is within the first intensity range and is low. If the sound intensity of the target sound signal is within the second intensity interval, it indicates that the intensity of sound of the user is within the first intensity range and is high, which may cause noise. Therefore, different display states (i.e., a first display state and a second display state) may be set for these two intensity intervals. For example, in the example of breaking the brick described above, the first display state may correspond to a state in which the brick is broken into four pieces, and the second display state may correspond to a state in which the brick is broken into eight pieces. That is, if the sound of the user is within the first intensity interval, the brick is broken into four pieces and if the sound of the user is within the second intensity interval, the brick is broken into eight pieces.

In the way above, the switched display state of the target object may reflect the intensity interval of the user sound intensity in the first intensity range, which is convenient for the user to make subsequent adjustment to the sound, does not affect the use of the terminal, and can prevent the problem of causing noise.

In step 42, the image material corresponding to the first intensity range is determined, in response to the sound intensity of the target sound signal within the first intensity range.

In step 43, the second face image is generated according to the first face image and the image material corresponding to the first intensity range, and the first face image is replaced with the second face image.

For example, a correspondence between the first intensity range and the image material may be pre-stored. In this way, if the sound intensity of the target sound signal is within the first intensity range, the image material corresponding to the first intensity range may be determined, and the second face image may be generated according to the first face image and the image material corresponding to the first intensity range.

In a possible embodiment, the first intensity range may also be segmented into several intensity intervals, and respective intensity intervals correspond to different image materials. In this way, if the sound intensity of the target sound signal is within the first intensity range, the intensity interval of the sound intensity of the target sound signal may be further determined, to determine the corresponding image material. Here, the determined image material may reflect the intensity interval of the target sound signal in the first intensity rang, and thus the presentation of the image material is more detailed.

For example, the first intensity range may be divided into a first intensity interval with low intensity and a second intensity interval with high intensity at an intermediate value. If the sound intensity of the target sound signal is within the first intensity interval, it indicates that the intensity of the sound of the user is within the first intensity range and is low. If the sound intensity of the target sound signal is within the second intensity interval, it indicates that the intensity of sound of the user is within the first intensity range and is high, which may cause noise. Therefore, different image materials (i.e., first image material and second image mated al) may be set for these two intensity intervals. For example, in the example of breaking the brick described above, the first image material may correspond to a smile expression sticker, and the second image material may correspond to a surprise expression sticker. That is, if the sound of the user is within the first intensity interval, the smile expression sticker is added to the face image of the user; and if the sound of the user is within the second intensity interval, the surprise expression sticker is added to the face image of the user.

In the way above, the switched face image (i.e., the second face image) may reflect the intensity interval of the sound intensity of the user in the first intensity rang, which is convenient for the user to make subsequent adjustment to the sound, does not affect the use of the terminal, and can prevent the problem of causing noise.

It should be noted that the execution of the step 41 and steps 42 to 43 above is not limited in order. Steps 41 to 43 may be performed sequentially in the order shown in FIG. 4. Alternatively, steps 42 to 43 may be performed first, and then step 41 is performed. Alternatively, step 41 and steps 42 to 43 may be performed simultaneously.

Optionally, the method according to the present disclosure may further include: keeping the display state of the target object unchanged and switching the first face image in the user display area to the third face image, in response to the sound intensity of the target sound signal within the second intensity range.

For example, the second intensity range may be set to an intensity range obtained by removing the first intensity range. For example, if the first intensity range is set to be greater than or equal to the first intensity threshold, the second intensity range may be an intensity range from zero to the first intensity threshold.

In addition, the face image may also be switched accordingly. The third face image is obtained based on the first face image. For example, a manner for determining the third face image may include: determining an image material corresponding to the second intensity range, if the sound intensity of the target sound signal is within the second intensity range; and generating a third face image according to the first face image and the image material corresponding to the second intensity range, and replacing the first face image with the third face image.

For example, a correspondence between the second intensity range and the image material may be pre-stored. In this way, if the sound intensity of the target sound signal is within the second intensity range, the image material corresponding to the second intensity range may be determined, and the third face image may be generated according to the first face image and the image material corresponding to the second intensity range. For example, in the example of breaking the brick described above, the image material corresponding to the second intensity range may correspond to a crying expression sticker. That is, if the sound of the user cannot break the brick, the crying expression sticker is added to the face image of the user. In this way, it is convenient for the user to make subsequent adjustment to the sound.

In an embodiment, the method provided in the present disclosure may further include: determining a first action value according to the sound intensity of the target sound signal, in response to obtaining an instruction for determining a user action value; and determining the user action value according to the first action value.

The first action value is used to characterize a matching degree between the sound intensity of the target sound signal and the standard intensity demanded by the target object. In other words, the intensity of the sound of the user is closer to the standard intensity demanded by the target object, the larger the first action value is. For example, a correspondence between the sound intensity and the action value may be preset for the target object, so that the first action value may be directly determined according to the sound intensity of the target sound signal.

After the first action value is determined, the user action value may be further determined. For example, the first action value may be directly used as the user action value. In the example of breaking the brick described above, the user action value corresponds to game scores obtained by the user in a single brick breaking process.

In an embodiment, the method according to the present disclosure may further include: determining a second action value according to the first face image, in response to obtaining an instruction for determining the user action value; and determining the user action value according to the second action value.

The second action value is used to characterize a matching degree between an expression feature of the first face image and a standard feature demanded by the target object. That is, the expression of the user is closer to the standard feature demanded by the target object, the larger the second action value is.

After the second action value is determined, the user action value may be further determined. For example, the second action value may be used as the user action value.

In an embodiment, the user action value may be determined in combination with the sound and facial expression of the user, that is, the user action value is jointly determined in combination with the first action value and the second action value. For example, after the first action value and the second action value are determined, the user action value may be determined according to the first action value and the second action value. For example, calculation weights may be preset for the first action value and the second action value, and the user action value may be determined according to the first action value, the second action value and their respective weights.

After the user action value is determined, the user action value may be further displayed on the screen of the terminal to notify the user. For example, in the example of breaking the brick described above, displaying the user action value is to display the scores obtained by breaking the brick by the user this time.

Figure 5:
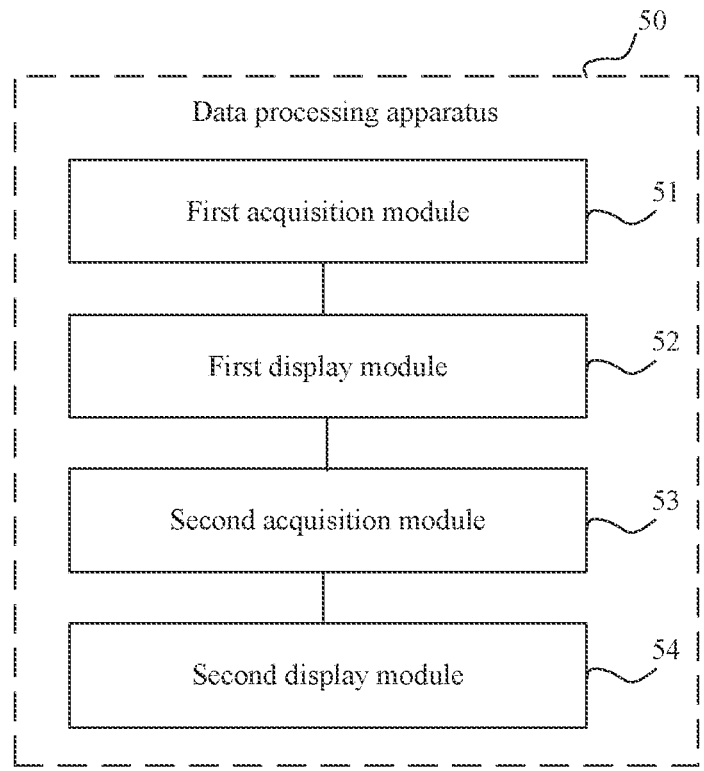
FIG. 5 is a block diagram showing a data processing apparatus according to an embodiment of the present disclosure.

FIG. 5 is a block diagram showing a data processing apparatus according to an embodiment of the present disclosure. As shown in FIG. 5, the data processing apparatus 50 may include a first acquisition module 51, a first display module 52, a second acquisition module 53, and a second display module 54.

The first acquisition module 51 is configured to acquire a face image of a user by a terminal as a first face image.

The first display module 52 is configured to display the first face image in a user display area of a screen of the terminal.

The second acquisition module 53 is configured to acquire a sound signal of the user as a target sound signal, in a case that a target object is displayed on the screen of the terminal.

The second display module 54 is configured to switch a display state of the target object and switch the first face image in the user display area to a second face image, in response to a sound intensity of the target sound signal within a first intensity range, where the second face image is obtained based on the first face image.

Optionally, a body image is displayed in the user display area.

The apparatus 50 also includes a first determination module, a second determination module, and a third determination module.

The first determination module is configured to determine position information of the user according to the first face image, where the position information is used to indicate an offset direction and an offset angle of the user relative to the terminal.

The second determination module is configured to determine the body image corresponding to the first face image, according to the position information and pre-stored image material.

The third determination module is configured to display the body image in the user display area.

In an embodiment, the target object moves on the screen of the terminal at a first speed along a preset path, in a process of displaying the target object on the screen of the terminal.

In an embodiment, the second acquisition module 53 is configured to acquire the sound signal of the user as the target sound signal, in a case that the target object is located in a designated area of the screen of the terminal.

In an embodiment, the apparatus 50 further includes a fourth determination module and a fifth determination module.

The fourth determination module is configured to perform a sound content recognition on the target sound signal, to determine a sound content corresponding to the target sound signal.

The fifth determination module is configured to determine a second speed corresponding to a preset keyword, in the case that the sound content corresponding to the target sound signal includes the preset keyword, and switch a moving speed of the target object on the screen of the terminal from the first speed to the second speed.

In an embodiment, the second display module 54 includes a first determination sub-module, a second determination sub-module and an image generation sub-module.

The first determination sub-module is configured to determine a display state corresponding to the first intensity range in response to the sound intensity of the target sound signal within the first intensity range; and display the target object in the display state corresponding to the first intensity range.

The second determination sub-module is configured to determine image material corresponding to the first intensity range, in response to the sound intensity of the target sound signal within the first intensity range.

The image generation sub-module is configured to generate the second face image according to the first face image and the image material corresponding to the first intensity range, and replace the first face image with the second face image.

In an embodiment, the apparatus 50 further includes a third display module configured to keep a display state of the target object unchanged in response to the sound intensity of the target sound signal within a second intensity range, and switch the first face image in the user display area to a third face image, where the third face image is obtained based on the first face image.

In an embodiment, the apparatus 50 further includes a sixth determination module and a seventh determination module.

The sixth determination module is configured to determine a first action value according to the sound intensity of the target sound signal, in response to obtaining an instruction for determining a user action value, where the first action value is used to characterize a matching degree between the sound intensity of the target sound signal and a standard intensity demanded by the target object.

The seventh determination module is configured to determine the user action value according to the first action value.

In an embodiment, the apparatus 50 further includes an eighth determination module and a ninth determination module.

The eighth determination module is configured to determine a second action value according to the first face image, in response to obtaining an instruction for determining a user action value, where the second action value is used to characterize a matching degree between an expression feature of the first face image and a standard feature demanded by the target object.

The ninth determination module is configured to determine the user action value according to the second action value.

For the apparatus according to the embodiments described above, the manners in which the modules perform operations have been described in detail in the embodiments of the method, which will not be described in detail herein.

Figure 6:
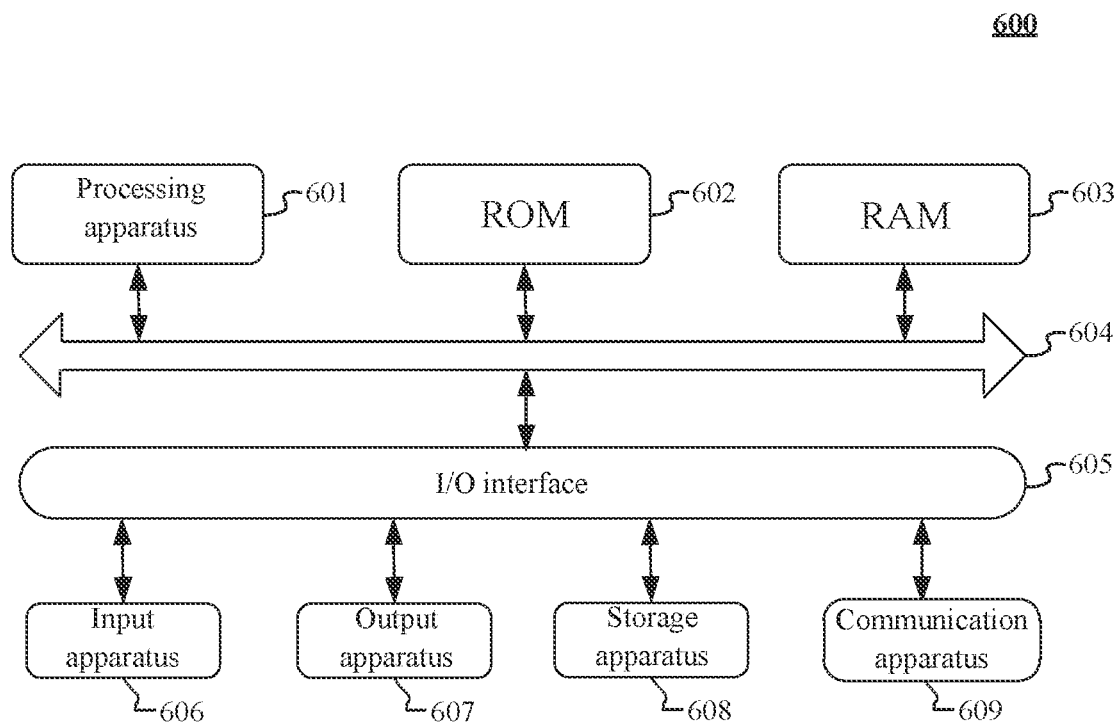
FIG. 6 is a structural schematic diagram of an electronic device suitable for implementing an embodiment of the present disclosure.

Reference is made to FIG. 6, which shows a schematic structural diagram of an electronic device 600 suitable for implementing the embodiments of the present disclosure. The terminal device according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic device shown in FIG. 6 is only exemplary, and should not indicate any limitation to the function and application scope of the embodiments of the present disclosure.

As shown in FIG. 6, the electronic device 600 may include a processing apparatus 601, such as a central processor or a graphics processor, which may execute various proper operations and processing based on a program stored in a Read Only Memory (ROM) 602 or a program loaded from a storage apparatus 608 into a Random Access Memory (RAM) 603. The RAM 603 is further configured to store various programs and data demanded by the electronic device 600. The processing apparatus 601, the ROM 602 and the RAM 603 are connected to each other through a bus 604. An Input/output WO) interface 605 is also connected to the bus 604.

Generally, the I/O interface 605 may be connected to: an input apparatus 606, such as a touch screen, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The communication apparatus 609 enables wireless or wired communication between the electronic device 600 and other devices for data exchanging. Although FIG. 6 shows an electronic device 600 having various apparatus, it should be understood that the illustrated apparatus are not necessarily required to all be implemented or embodied. Alternatively, more or fewer apparatuses may be implemented or included.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 609, or installed from the storage 608, or installed from the ROM 602. When the computer program is executed by the processing apparatus 601, the functions defined in the method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. More specific examples of the computer readable storage medium may be, but are not limited to, an electrical connection with one or more wires, a portable computer disk, a hard disk, a random access memory (RAM), a read-only memory (ROM) an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client device can communicate using any currently known or future developed network protocol such as HyperText Transfer Protocol (HTTP), and can be interconnected with any form or medium of digital data communication (e.g., a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer-readable medium carries one or more programs. The one or more programs, when executed by the electronic device, cause the electronic device to: acquire the face image of the user by the terminal as the first face image; display the first face image in the user display area of the screen of the terminal; acquiring the sound signal of the user as the target sound signal, in a case that a target object is displayed on the screen of the terminal; switch the display state of the target object and switch the first face image in the user display area to a second face image, in response to the sound intensity of the target sound signal within the first intensity range, where the second face image is obtained based on the first face image.

The computer program code for performing the operations disclosed in the present disclosure may be written in one or more programming languages or combinations thereof. The programming languages include, but not limit to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to the user computer through any network, including local area network (LAN) or wide area network (WAN), or may be connected to an external computer (for example, through the Internet provided by an Internet service provider).

Flowcharts and block diagrams in the drawings illustrate the architecture, functions and operations that can be implemented by a system, a method and a computer program produce according to various embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The modules mentioned in the embodiments of the present disclosure may be implemented by means of software, or otherwise by means of hardware. The name of the module does not constitute a restriction on the module itself in some cases. For example, the first acquisition module may also be described as "a module for acquiring the face image of the user by the terminal".

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

According to one or more embodiments of the present disclosure, a data processing method is provided. The method includes:

acquiring, by a terminal, a face image of a user as a first face image;

displaying the first face image in a user display area of a screen of the terminal;

acquiring a sound signal of the user as a target sound signal, in a case that a target object is displayed on the screen of the terminal; and switching a display state of the target object and switching the first face image in the user display area to a second face image, in response to a sound intensity of the target sound signal within a first intensity range, where the second face image is obtained based on the first face image.

According to one or more embodiments of the present disclosure, in the data processing method, a body image is displayed in the user display area.

The data processing method further includes:

determining position information of the user according to the first face image, where the position information is used to indicate an offset direction and offset angle of the user relative to the terminal;

determining the body image corresponding to the first face image, according to the position information and pre-stored image material; and displaying the body image in the user display area.

According to one or more embodiments of the present disclosure, in the data processing method, the target object moves on the screen of the terminal at a first speed along a preset path, in a process of displaying the target object on the screen of the terminal.

According to one or more embodiments of the present disclosure, in the data processing method, the acquiring the sound signal of the user as a target sound signal in a case that a target object is displayed on the screen of the terminal includes:

acquiring the sound signal of the user as the target sound signal, in a case that the target object is located in a designated area of the screen of the terminal.

According to one or more embodiments of the present disclosure, the data processing method further includes:

performing a sound content recognition on the target sound signal to determine a sound content corresponding to the target sound signal; and determining a second speed corresponding to a preset keyword, in the case that the sound content corresponding to the target sound signal includes the preset keyword, and switching a moving speed of the target object on the screen of the terminal from the first speed to the second speed.

According to one or more embodiments of the present disclosure, in the data processing method, the switching a display state of the target object and switching the first face image in the user display area to a second face image, in response to a sound intensity of the target sound signal within a first intensity range, includes:

determining a display state corresponding to the first intensity range, in response to the sound intensity of the target sound signal within the first intensity range; and displaying the target object in the display state corresponding to the first intensity range;

determining image material corresponding to the first intensity range in response to the sound intensity of the target sound signal within the first intensity range; and generating the second face image according to the first face image and the image material corresponding to the first intensity range, and replacing the first face image with the second face image.

According to one or more embodiments of the present disclosure, the data processing method further includes:

keeping a display state of the target object unchanged in response to the sound intensity of the target sound signal within the second intensity range, and switching the first face image in the user display area to a third face image, where the third face image is obtained based on the first face image.

According to one or more embodiments of the present disclosure, a data processing method further includes:

determining a first action value according to the sound intensity of the target sound signal, in response to obtaining an instruction for determining a user action value, where the first action value is used to characterize a matching degree between the sound intensity of the target sound signal and a standard intensity demanded by the target object; and determining the user action value according to the first action value.

According to one or more embodiments of the present disclosure, the data processing method further includes:

determining a second action value according to the first face image, in response to obtaining an instruction for determining a user action value, where the second action value is used to characterize a matching degree between an expression feature of the first face image and a standard feature demanded by the target object; and determining the user action value according to the second action value.

According to one or more embodiments of the present disclosure, a data processing apparatus is provided. The apparatus further includes:

a first acquisition module configured to acquire a face image of a user by a terminal as a first face image;

a first display module configured to display the first face image in a user display area of a screen of the terminal;

a second acquisition module configured to acquire a sound signal of the user as a target sound signal, in a case that a target object is displayed on the screen of the terminal; and a second display module configured to switch a display state of the target object and switch the first face image in the user display area to a second face image, in response to a sound intensity of the target sound signal within a first intensity range, where the second face image is obtained based on the first face image.

According to one or more embodiments of the present disclosure, a computer-readable medium storing a computer program thereon is provided. The program, when executed by a processing apparatus, causes the processing apparatus to perform the steps of the method according to any of the embodiments of the present disclosure.

According to one or more embodiments of the present disclosure, an electronic device is provided. The electronic device includes:
- a storage apparatus storing a computer program thereon;
- a processing apparatus for executing the computer program in the storage apparatus to perform the steps of the method according to any of the embodiments of the present disclosure.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. Some features described in a separate embodiment may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims. For the device according to the embodiments described above, the manners in which the modules perform operations have been described in detail in the embodiments of the method, which are not described in detail herein.

The invention claimed is:

1. A data processing method, comprising:
   acquiring, by a terminal, a face image of a user as a first face image;
   displaying the first face image in a user display area of a screen of the terminal;
   acquiring a sound signal of the user as a target sound signal, in a case that a target object is displayed on the screen of the terminal, wherein the target object is different from the first face image of the user, and wherein the target object moves on the screen of the terminal at a first speed along a preset path, in a process of displaying the target object on the screen of the terminal; and
   switching a display state of the target object and switching the first face image in the user display area to a second face image, in response to a sound intensity of the target sound signal within a first intensity range, wherein the second face image is obtained based on the first face image.

2. The data processing method according to claim 1, wherein the first intensity range corresponds to the target object.

3. The data processing method according to claim 1, wherein a body image is displayed in the user display area; and
   the data processing method further comprises:
   determining position information of the user according to the first face image, wherein the position information is used to indicate an offset direction and an offset angle of the user relative to the terminal;
   determining the body image corresponding to the first face image according to the position information and pre-stored image material; and
   displaying the body image in the user display area.

4. The data processing method according to claim 3, wherein the position information is two-dimensional information or three-dimensional information.

5. The data processing method according to claim 1, wherein the acquiring the sound signal of the user as a target sound signal, in a case that a target object is displayed on the screen of the terminal, comprises:
   acquiring the sound signal of the user as the target sound signal, in a preset period after the target object starts to be displayed on the screen of the terminal.

6. The data processing method according to claim 1, wherein the target object is dynamically displayed on the screen of the terminal.

7. The data processing method according to claim 1, wherein the acquiring the sound signal of the user as a target sound signal, in a case that a target object is displayed on the screen of the terminal, comprises:
   acquiring the sound signal of the user as the target sound signal, in a case that the target object is located in a designated area of the screen of the terminal.

8. The data processing method according to claim 1, further comprising:
   performing a sound content recognition on the target sound signal, to determine a sound content corresponding to the target sound signal;
   determining a second speed corresponding to a preset keyword, in a case that the sound content corresponding to the target sound signal comprises the preset keyword; and
   controlling a moving speed of the target object on the screen of the terminal to switch from the first speed to the second speed.

9. The data processing method according to claim 1, wherein the switching a display state of the target object and switching the first face image in the user display area to a second face image, in response to the sound intensity of the target sound signal within the first intensity range, comprises:
   determining a display state corresponding to the first intensity range, in response to the sound intensity of the target sound signal within the first intensity range; and
   displaying the target object in the display state corresponding to the first intensity range; and
   determining image material corresponding to the first intensity range, in response to the sound intensity of the target sound signal within the first intensity range; generating the second lace image according to the first face image and the image material corresponding to the first intensity range, and replacing the first face image with the second face image.

10. The data processing method according to claim 9, wherein the first intensity range comprises a first intensity interval and a second intensity interval, the first intensity interval corresponds to a first display state and first image material, and the second intensity interval corresponds to a second display state and second image material, and wherein the determining a display state corresponding to the first intensity range, in response to the sound intensity of the target sound signal within the first intensity range; and displaying the target object in the display state corresponding to the first intensity range, comprises:

determining the first display state corresponding to the first intensity interval, in response to the sound intensity of the target sound signal within the first intensity interval; and displaying the target object in the first display state; and determining the second display state corresponding to the second intensity interval, in response to the sound intensity of the target sound signal within the second intensity interval; and displaying the target object in the second display state; and the determining the image material corresponding to the first intensity range, in response to the sound intensity of the target sound signal within the first intensity range; generating the second face image according to the first face image and the image material corresponding to the first intensity range; and replacing the first face image with the second face image, comprises:

determining the first image material corresponding to the first intensity interval, in response to the sound intensity of the target sound signal within the first intensity interval; generating the second face image according to the first face image and the first image material; and replacing the first face image with the second face image; and determining the second image material corresponding to the second intensity interval, in response to the sound intensity of the target sound signal within the second intensity interval; generating the second face image according to the first face image and the second image material; and replacing the first face image with the second face image.

11. The data processing method according to claim 1, further comprising:

keeping the display state of the target object unchanged in response to the sound intensity of the target sound signal within a second intensity range, and switching the first face image in the user display area to a third face image, wherein the third face image is obtained based on the first face image.

12. The data processing method according to claim 1, further comprising:

determining a first action value according to the sound intensity of the target sound signal, in response to obtaining an instruction for determining a user action value, wherein the first action value is used to characterize a matching degree between the sound intensity of the target sound signal and a standard intensity demanded by the target object; and determining the user action value according to the first action value.

13. The data processing method according to claim 1, further comprising:

determining a second action value according to the first face image, in response to obtaining an instruction for determining a user action value, wherein the second action value is used to characterize a matching degree between an expression feature of the first face image and a standard feature demanded by the target object; and determining the user action value according to the second action value.

14. The data processing method according to claim 1, further comprising:

determining a first action value according to the sound intensity of the target sound signal and determining a second action value according to the first face image, in response to obtaining an instruction for determining a user action value, wherein the first action value is used to characterize a matching degree between the sound intensity of the target sound signal and a standard intensity demanded by the target object, and the second action value is used to characterize a matching degree between an expression feature: of the first face image and a standard feature demanded by the target object; and determining the user action value according to the first action value and the second action value.

15. The data processing method according to claim 12, further comprising:

displaying the user action value on the screen of the terminal.

16. A non-transitory computer-readable medium storing a computer program thereon, wherein the program, when executed by a processing apparatus, causes the processing apparatus to:

acquire a face image of a user as a first face image;

display the first face image in a user display area of a screen of a terminal;

acquire a sound signal of the user as a target sound signal, in a case that a target object is displayed on the screen of the terminal, wherein the target object is different from the first face image of the user, and wherein the target object moves on the screen of the terminal at a first speed along a preset path, in a process of displaying the target object on the screen of the terminal; and switch a display state of the target object and switch the first face image in the user display area to a second face image, in response to a sound intensity of the target sound signal within a first intensity range, wherein the second face image is obtained based on the first face image.

17. An electronic device, comprising:

a storage apparatus storing a computer program thereon;

a processing apparatus for executing the computer program in the storage apparatus to:

acquire a face image of a user as a first face image;

display the first face image in a user display area of a screen of a terminal;

acquire a sound signal of the user as a target sound signal, in a case that a target object is displayed on the screen of the terminal, wherein the target object is different from the first face image of the user, and wherein the target object moves on the screen of the terminal at a first speed along a preset path in a process of displaying the target object on the screen of the terminal; and switch a display state of the target object and switch the first face image in the user display area to a second face image, in response to a sound intensity of the target sound signal within a first intensity range, wherein the second lace image is obtained based on the first face image.

18. The electronic device according to claim 17, wherein a body image is displayed in the user display area; and the computer program, when executed by the processing apparatus, causes the processing apparatus to:

determine position information of the user according to the first face image, wherein the position information is used to indicate an offset direction and an offset angle of the user relative to the terminal;

determine the body image corresponding to the first face image according to the position information and pre-stored image material; and display the body image in the user display area.

* * * * *